United States Patent [19]

Kataoka et al.

[11] Patent Number: 4,750,815
[45] Date of Patent: Jun. 14, 1988

[54] METHOD AND APPARATUS FOR GENERATING OPTICAL INFORMATION

[75] Inventors: Keiji Kataoka, Kawagoe; Akira Arimoto, Musashimurayama, both of Japan

[73] Assignee: Hitachi, Ltd., Tokyo, Japan

[21] Appl. No.: 798,432

[22] Filed: Nov. 15, 1985

[30] Foreign Application Priority Data

Nov. 16, 1984 [JP] Japan .............................. 59-241727
Sep. 25, 1985 [JP] Japan .............................. 60-209947

[51] Int. Cl.$^4$ ............................................. G02F 1/03
[52] U.S. Cl. ...................................... 350/356; 350/392
[58] Field of Search ......... 350/356, 388, 392, 380-383, 350/96.14, 162.17

[56] References Cited

U.S. PATENT DOCUMENTS

| | | |
|---|---|---|
| Re. 28,702 | 1/1976 | Macovski ..................... 350/162.17 |
| 2,002,515 | 5/1935 | Worrall ............................. 350/387 |
| 3,923,380 | 12/1975 | Hattori et al. ..................... 350/356 |
| 4,389,659 | 6/1983 | Sprague ........................... 346/153.1 |
| 4,396,252 | 8/1983 | Turner .............................. 350/356 |
| 4,421,387 | 12/1983 | Sprague ............................ 350/356 |
| 4,450,459 | 5/1984 | Turner et al. .................... 350/356 |
| 4,468,084 | 8/1984 | Hutcheson et al. ............... 350/356 |

OTHER PUBLICATIONS

Flores et al., "A Linear Total Internal Reflection Spatial Light Modulator and its Application in Optical Information Processing", Conf.: Topical Meeting on Integrated & Guided Wave Optics, Pacific Grove, CA USA, Jun. 6-8, 1982 pp. FA3/1-4.
Kingston et al., "Broadband Guided-Wave Optical Frequency Translator Using an Electro-Optical Bragg Array", App. Phys. Lett. 5-1-83, pp. 759-761.
Sasaki et al., "Electrooptic Multichannel Waveguide Deflector" Electronics Letts. 5-12-77 pp. 295-296.
Hammer et al., "Low-Loss Single-Mode Optical Waveguides & Efficient Hihg-Speed Modulators of $Linb_xO_3$ on $LitaO_3$," App. Phys. Letts. 6-1974, pp. 545-547.
Cole, T. W. "Electrooptical Array Processor for Complex Signals" App. Optics, 9-15-78, pp. 2952-2955.
Cole, T. W. "Configurations for the Complex-Internal-Reflection (C.T.R.) Light Modulator", Electronics Letts. 4-12-79, pp. 217-218.
De Barros et al., "High-Speed Electro-Optic Diffraction Modulator for Baseband Operation", Proc. IEE 7-1972, pp. 807-814.
Sprague et al., "Linear Total Internal Reflection Spatial Light Modulator for Laser Printing" Proc. SPIE vol. 388, p. 46+.

*Primary Examiner*—William H. Punter
*Attorney, Agent, or Firm*—Antonelli, Terry & Wands

[57] ABSTRACT

A method and apparatus for generating optical information are disclosed. A plurality of electrode wires are arranged on an electro-optical crystal, a light beam passing through the electro-optical crystal is spatially phase-modulated by an electro-optical effect due to a voltage applied to the electrode wires, a portion of light distribution spread by diffraction of the phase-modulated light beam is blocked by an optical system having an aperture or a slit arranged on a focal plane of the optical system, and the light passed through the aperture is focused to generate optical information composed of a minimum unit equal to a multiple of a minimum electrode-to-electrode distance.

32 Claims, 8 Drawing Sheets

METHOD AND APPARATUS FOR GENERATING OPTICAL INFORMATION

BACKGROUND OF THE INVENTION

The present invention relates to a method and apparatus for generating optical information, and more particularly to a method and apparatus for generating optical information, which is suitable for an optical recorder such as a laser printer.

Since a conventional laser printer uses a rotating polygon mirror it has been difficult to make it in a compact and solid form. A compact apparatus which used a spatial modulation device has been proposed. (See Proceedings of SPIE (The Society of Photo-Optical Instrumentation Engineers), Vol. 388, p 46). A principle of operation of the apparatus is explained with reference to FIGS. 14, 15 and 16.

FIG. 14 shows an electrode wire pattern formed on a $LiNbO_3$ crystal 1. The electrode wire pattern comprises a plurality of electrode wires 2. FIG. 15 is a side elevational view of the electrode wires 2 of FIG. 14. By applying a positive or negative voltage to the electrode wires 2, a fringing electric field 8 is generated near the surface in the crystal. If the adjacent electrode wires 2 are of the same potential, no electric field is generated between those electrode wires. Crystal areas between the electrode wires are information areas. In FIG. 15, information "101" is generated between the electrode wires 2 depending on whether the fringing field is generated or not. FIGS. 16A and 16B show a plan view and side elevational view of a conventional spatial modulation device, respectively. When an input laser beam 3 reflects on the surface of the crystal 1, it is phase-modulated by an electro-optical effect due to the fringing electric field shown in FIG. 15. The information generated in the crystal 1 is focused onto a screen 6 by focusing lens 4. Since the information generated in the crystal 1 is phase-modulated, it is necessary to convert the light phase pattern to a light intensity pattern. To this end, a Schlieren optics is used in FIG. 16. A laser beam which passed through the information area having no fringing electric field is blocked by a stopper 5, but since a laser beam which passed through the information area having the fringing electric field is phase-modulated, a light spot spreads on a focal plane of the focusing lens 4 and a light component spread beyond the stopper 5 reaches the screen 6.

In the spatial modulation device of FIG. 16, positional adjustment of the stopper 5 and shape of the stopper 5 largely affect to a signal-to-noise ratio of the information on the screen 6. If the stopper 5 is laterally or longitudinally moved even slightly, the light may be leaked. Thus, the shape and size of the stopper 5 largely affect to the formation of the information.

Further, this system needs high cost because a large crystal is required, and an optical system extending from the laser light source to the crystal is also of large size in order to form the laser beam 3 to be applied to the crystal into a beam shape.

SUMMARY OF THE INVENTION

It is an object of the present invention to provide a method and apparatus for generating optical information, which does not use a stopper and is compact and reliable.

In accordance with the present invention, a plurality of electrode wires are arranged on an electro-optical crystal, a light beam passing through the electro-optical crystal is spatially phase-modulated by an electro-optical effect due to a voltage applied to the electrode wires, a portion of light distribution spread by diffraction of the phase-modulated light beam is blocked by an optical system having an aperture or a slit arranged on a focal plane of the optical system, and the light passed through the aperture is focused so that light information composed of a minimum unit which is a multiple of a minimum electrode-to-electrode distance is generated.

An optical waveguide layer is formed on the surface of the electro-optical crystal and a linearly polarized laser beam is applied to the optical waveguide guide layer. Since optical elements such as lenses and gratings can be integrally formed on the optical waveguide layer, the size and cost of the optical system are reduced. Since only the surface of the electro-optical crystal is used in operation, the electro-optical crystal may be a thin film. A plurality of such units can be readily arranged in parallel to provide a large capacity apparatus.

DESCRIPTION OF THE PREFERRED EMBODIMENTS

Figure 1:
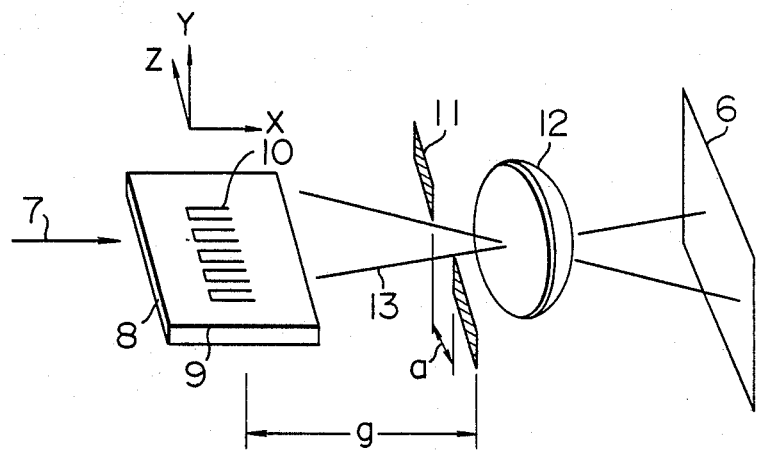
FIG. 1 is a perspective view of one embodiment of an optical information generation apparatus of the present invention.
Figure 2:
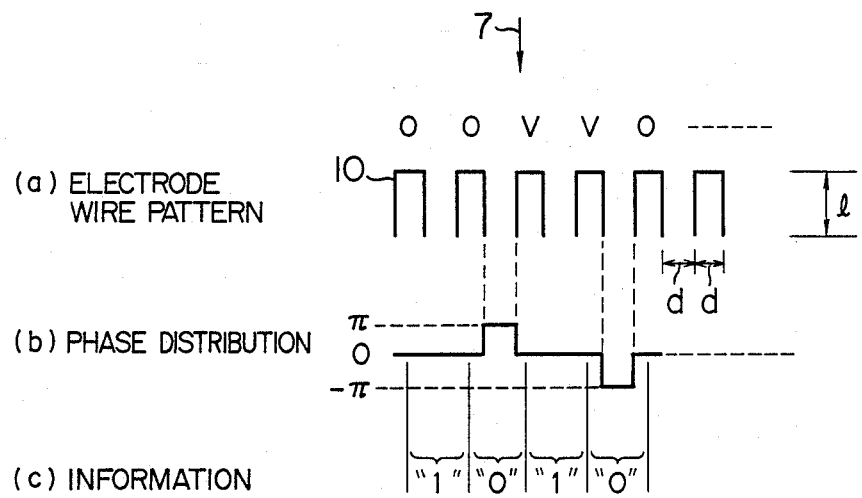
FIG. 2 is a diagram for explaining the operating principle of the apparatus shown in FIG. 1.

FIG. 1 is a perspective view of one embodiment of the optical information generation apparatus of FIG. 1, and FIG. 2 illustrates an optical information generation operation in FIG. 1.

In FIG. 1, numeral 8 denotes a Y-cut $LiNbO_3$ crystal, numeral 9 denotes an optical waveguide layer which is fabricated by Ti-diffusion on the surface of the crystal, numeral 10 denotes electrode wires, numeral 11 denotes a slit, and numeral 12 denotes a lens.

Figure 16A:
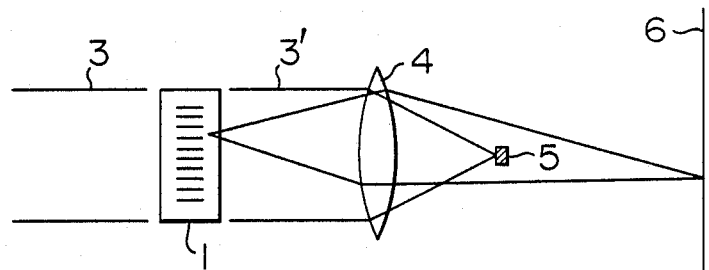
Figure 16B:
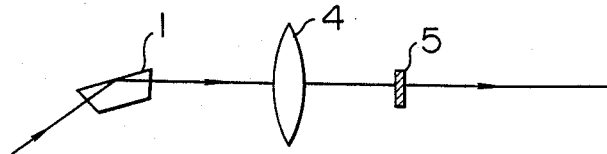

Directions X, Y and Z are spatially defined as shown. A linearly polarized laser beam 7 which is polarized in parallel to the direction Z (which is generated by a semiconductor laser, not shown) is directed to the optical waveguide layer 9 on the surface of the crystal 8. In the prior art apparatus described above, the light is directed to the crystal at an angle to the surface of the crystal as shown in FIG. 16B and the light reflected on the surface is directed to the lens 4. In the present embodiment, the linearly polarized laser beam is directed horizontally to the optical waveguide layer 9 formed on the surface of the crystal.

The electrode wires 10 are arranged on the optical waveguide layer in the direction Z and adjacent two wires are paired. Namely, the adjacent two wires are shorted at their ends. A voltage is applied to each pair and a fringing electric field is generated between adjacent pairs of the electrode wires.

Referring to FIG. 2, a principle of operation of the electrode wires 10 is explained. It is assumed here that one bit of information generated corresponds to two times a minimum spacing d between the electrode wire 10. Thus, a parameter m, which is explained later, is 2. A light 13 which passed through the pattern of the electrode wire 10 is phase-modulated by an electro-optical effect due to the voltage applied to the electrode wires 10. An electric field Ez generated by an applied voltage V is approximated by $$E_z = \alpha(V/d) \quad (1)$$

where d is a spacing between the electrode wires 10, and $\alpha$ is a constant.

A phase $\phi$ of the light which passed through the electrode wires 10 is expressed by $$\phi = \frac{\pi}{\lambda} \cdot n_e^3 \cdot \gamma_{33} \cdot E_z \cdot l = \frac{\alpha\pi}{\lambda} \cdot n_e^3 \cdot \gamma_{33} \cdot \frac{V}{d} \cdot l \quad (2)$$

where $\lambda$ is a wavelength of the light, l is a length of the electrode wires 10, $N_e$ is an extraordinary index of refraction and $\gamma_{33}$ is an electro-optical constant of the optical waveguide layer 9. In the case of an optical waveguide layer formed by $T_1$-diffusion, the electro-optical constant is substantially equal to that of a LiNbO$_3$ crystal 8.

As will be explained later, the phase $\phi$ is set such that a contrast ratio on the screen or a light utilization factor is maximized. It is set to $\pi$ in the present example. The length l of the electrode wires 10 is given by the following formula from the formula (2).

$$l = \frac{\lambda \cdot d}{\alpha \cdot n_e^3 \cdot \gamma_{33} \cdot V} \quad (3)$$

For example, when the light source is a semiconductor laser having a wavelength $\lambda = 780$ nm and the crystal is a LiNbO$_3$ crystal, $n_e = 2.22$ and $\gamma_{33} = 30.8 \times 10^{-12}$ m/V. When d = 50 $\mu$m and V = 50 volts, l = 2.3 mm ($\alpha = 1$).

FIG. 2b shows a phase distribution of the light which passed throught the electrode wire pattern having the length l of the electrode wires 10 determined by the formula (3). As shown in FIG. 2a, when the voltage V is applied to the two center pairs, fringing electric fields of opposite polarities are generated at the left and right ends of these pairs, and the laser beam has the phase distribution of $\pi$ on the left end of the voltage-applied electrode wires 10, $-\pi$ on the right end thereof and 0 at other areas. In FIG. 1, an outgoing light 13 having the phase distribution shown in FIG. 2b reaches the screen 6 through the slit 11 and the lens 12. In FIG. 1, g represents a distance between the electrode pattern and the slit 11. The lens 12 functions to focus the phase distribution produced by the electrode wire pattern onto the screen 6. If all portions of the phase-modulated outgoing light 13 reach the screen 6, the phase-modulated information is lost on the screen 6 and a more bright line appears on the screen 6. In the present embodiment, the slit 11 is used to convert the phase-modulated light pattern to a light intensity pattern on the screen 6. The slit 11 is located at a position which is sufficiently distant compared with the width d of the electrode wire pattern, that is, at a far view field. A width a of the slit 11 is determined such that a light diffracted by the spacing d of the electrode wire pattern is sufficiently blocked and a light diffracted by spacing 2d which is two times as large as the spacing d of the electrode wire pattern is sufficiently transmitted. It is approximated by $$2.44 \cdot \frac{\lambda}{m \cdot d} \cdot \gamma < \frac{a}{g} < 2.44 \cdot \frac{\lambda}{d} \cdot \delta \quad (4)$$

where m=2 and $\gamma$ and $\delta$ are constants between 0 and 1 and determined by analysis of the contrast ratio and the light utilization factor. For example, $\gamma$ and $\delta$ are approximately 0.5.

In the formula (4), when d = 0.1 mm, g = 50 mm, $\gamma = \delta = 0.5$ and $\lambda = 780$ nm, then a may be set between 0.238 mm and 0.476 mm.

As the slit 11 is thus set, a light pattern "1010" is formed on the screen 6 as shown in FIG. 2c because the light passed throught the region with phase change due to the fringing electric field is diffracted by the spacing d of the pattern and blocked by the slit 11. On the other hand, the light passed throught the spacing of the electrode wires without fringing electric field is diffracted by two times of the spacing d of the pattern and sufficiently passed through the slit 11. As a result, the information "1" appears light and the information "0" appears dark on the screen 6.

In the embodiment of FIG. 1, the slit 11 is used. Alternatively, the slit 11 may be omitted and the diameter of the lens 12 may be set to be equal to the width a of the slit so that a similar effect is obtained.

Figure 3:
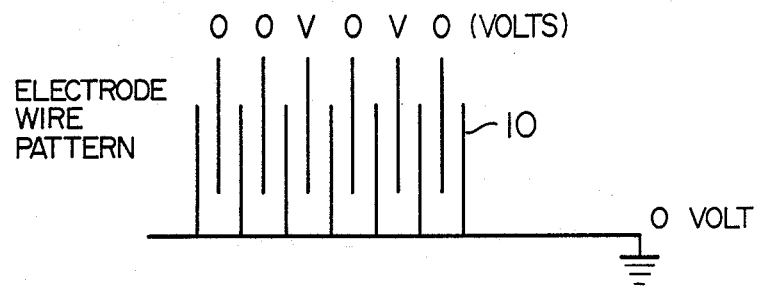
FIG. 3 is a diagram for explaining an electrode wire pattern used in the present invention.
Figure 3:
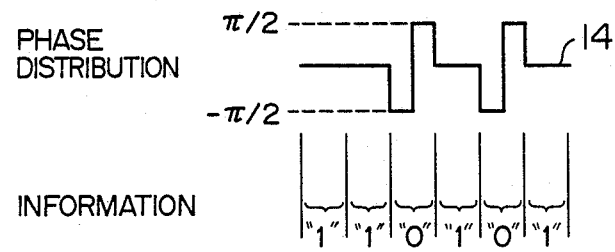

FIG. 3 shows another embodiment of the electrode wire pattern used in the present invention. In the electrode wire pattern 10 of FIG. 3, one bit of optical information corresponds to two times of the minimum electrode-to-electrode spacing, as it does in FIG. 2. Ends of every other electrode wires 10 arranged at the pitch d are shorted and grounded and voltages are selectively applied to the electrode wires other than the shorted electrodes in accordance with the information to be generated. When the phase of the light which passes through the voltage-applied electrodes is set to $\pm\pi/2$, the phase difference in the bit at the voltage-applied area is $\pi$, and the light passing through the center of the slit is darkened as a result of the light interference.

Figure 4:
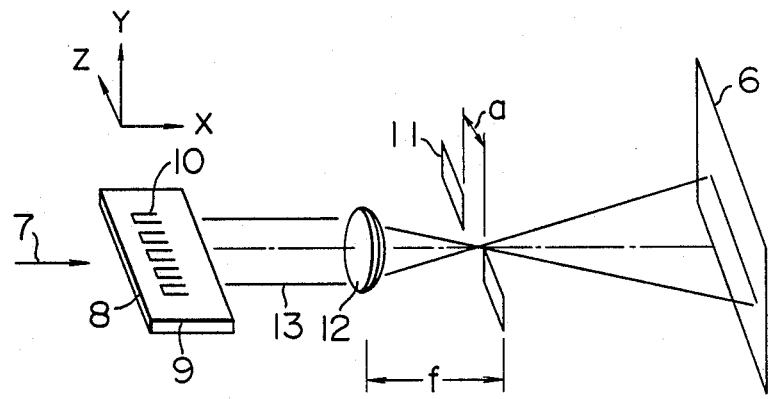
FIG. 4 is a perspective view of another embodiment of the optical information generation apparatus of the present invention.

FIG. 4 shows a perspective view of another embodiment of the optical information generation apparatus of the present invention.

In the embodiment of FIG. 1, the slit 11 is arranged in front of the lens 12. The slit 11 may be arranged near the focal plane of the lens as shown in FIG. 4. The width a of the slit 11 is given by the following formula instead of the formula (4).

$$2.44 \frac{\lambda}{m \cdot d} \cdot \gamma < \frac{a}{f} < 2.44 \frac{\lambda}{d} \cdot \delta \quad (5)$$

where f is a focal distance of the lens. Except for the slit 11, all elements and arrangement in FIG. 4 are identical to those of FIG. 1.

In the embodiments of FIGS. 1 and 4, a photoconductor drum may be used instead of the screen 6 so that a compact and thin laser beam printer which does not use a mechanical driver unit such as a rotating polygon mirror is attained. This is also true for the embodiments to be described later.

Figure 5A:
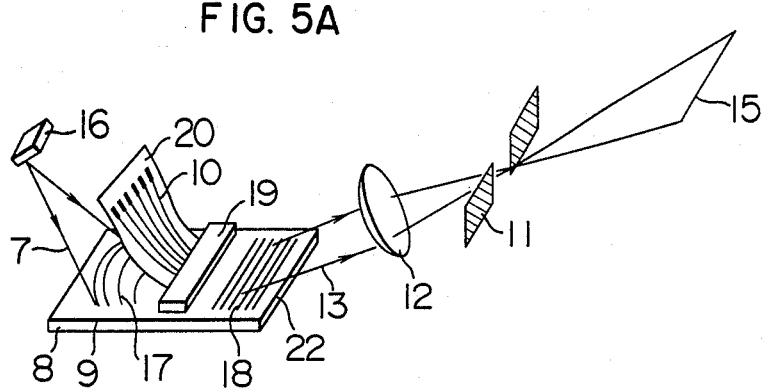
FIGS. 5A, 5B and 6 show perspective views of further embodiments of the present invention.
Figure 5B:
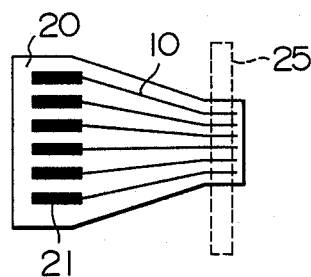

FIGS. 5A and 5B show another embodiment of the optical information generation apparatus of the present invention. A light 7 emitted from a semiconductor laser 16 is collimated by a grating lens 17 formed on an optical waveguide layer 9 and directed into the optical waveguide layer 9. An electrode pattern 10 formed on a resin substrate 20 is pressed on the optical waveguide layer by an elastic member 19 such as rubber. FIG. 5B shows an enlarged view of the electrode pattern formed on the resin substrate 20. A reference numeral 25 denotes an area in which the resin substrate 20 is pressed by the elastic member 19. By driving electrodes 21 such that adjacent pairs of electrodes are at the same potential, an equivalent electrode pattern to that shown in FIG. 2a is obtained. When every other electrode 21 is set to the same potential (for example, 0 volts) and the remaining electrodes are used as the information electrodes, an equivalent electrode pattern to that shown in FIG. 3 is obtained. A broken line block shows an area which is pressed by the elastic member 19. The electrodes 21 are soldered to wires through which the voltage is applied. The light modulated by the electrodes is taken out from the grating 18 or the end surface 22 and formed into the light pattern 15 by the lens and the slit as explained in FIG. 4.

Figure 6:
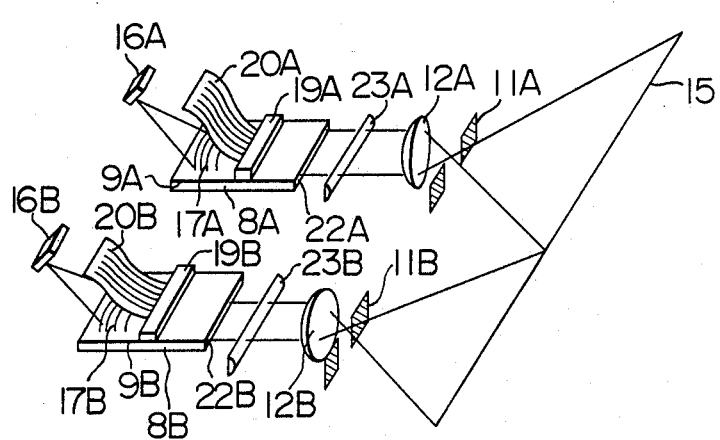

FIG. 6 shows an embodiment in which a plurality of units of FIG. 5A are arranged. Numerals 11A and 11B denote slits, 16A and 16B denote semiconductor lasers, 17A and 17B denote grating lenses, 19A and 19B denote elastic members, 20A and 20B denote resin substrates. Since the plurality of units can be readily arranged, a large number of bits of optical information can be displayed. In FIG. 6, the lights emitted from the end surfaces 22A, 22B of the crystals 8A, 8B spread widely in the thickness direction of the waveguide layers 9A, 9B. Accordingly, the spread is suppressed by cylindrical lenses 23A, 23B arranged between the crystals 8A, 8B and the lenses 12A, 12B.

Figure 7:
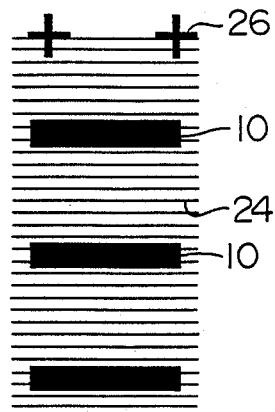
FIGS. 7 and 8 illustrate a striped optical waveguide used in the present invention.
Figure 8:
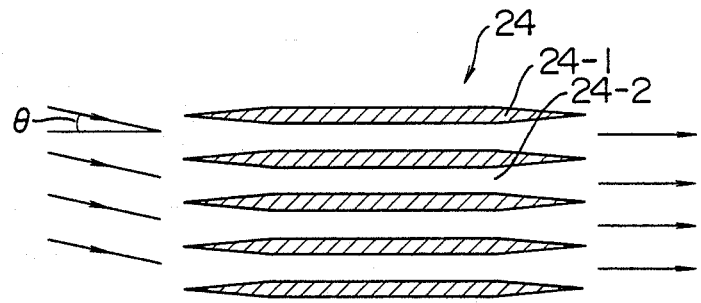

As explained in FIG. 1, it is necessary in the present invention that the direction of guiding the light and the lengthwise direction of the electrodes are precisely matched. However, since the direction of guiding the light is hard to view, the adjustment thereof is difficult to attain. Accordingly, instead of the uniform optical waveguide layer 9, a striped optical waveguide 24 is fabricated on the surface of the crystal 8 and the electrode pattern formed on the substrate 20 is aligned with the direction of the stripe. The alignment may be effected by aligning an alignment mark 26 formed on the substrate on which the electrode pattern 10 is formed as shown in FIG. 7, parallel to the direction of the strip. The electrode wires 10 in FIG. 7 show only those areas which are pressed on the crystal surface by the elastic member 19. The operation of the striped optical waveguide 24 is explained with reference to FIG. 8. Numberal 24-1 denotes areas which are not wave-guided, and numeral 24-2 denotes areas which are wave-guided. For Ti-diffused LiNbO$_3$, numeral 24-1 denotes areas into which Ti is not diffused. In such an optical waveguide, even if the light is applied at an angle $\theta$ relative to the direction of light guidance, the light is propagated along the striped optical waveguide. Accordingly, even if light applied to the crystal is slightly deviated, the lengthwise direction of the electrode wires and the direction of light propagation are equal if the lengthwise direction of the electrode wires matches to the direction of the stripe.

Figure 9:
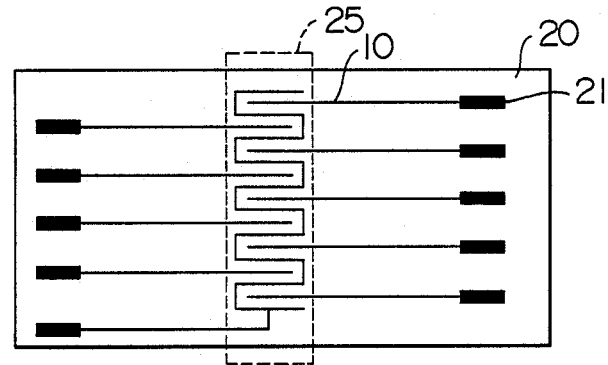
FIG. 9 shows a resin substrate on which the electrode pattern is arranged.

FIG. 9 shows another embodiment of the electrode pattern formed on the resin substrate shown in FIG. 5B. The electrodes 21 to be soldered are on the opposite sides of an area 25 which is pressed on the crystal. Thus, packaging of the wires is easier than that in FIG. 5B and a higher packing density of electrode pattern can be formed.

In FIGS. 5 and 6, the resin substrate is directly contacted to the crystal surface. Alternatively, an SiO$_2$ buffer or protection layer may be formed on the crystal surface.

Figure 10:
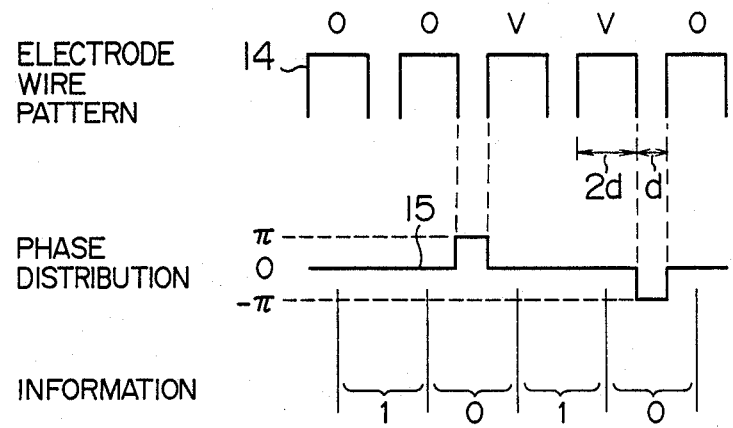
FIGS. 10 and 11 are diagrams for explaining other electrode patterns used in the present invention, FIG. 12A
Figure 11:
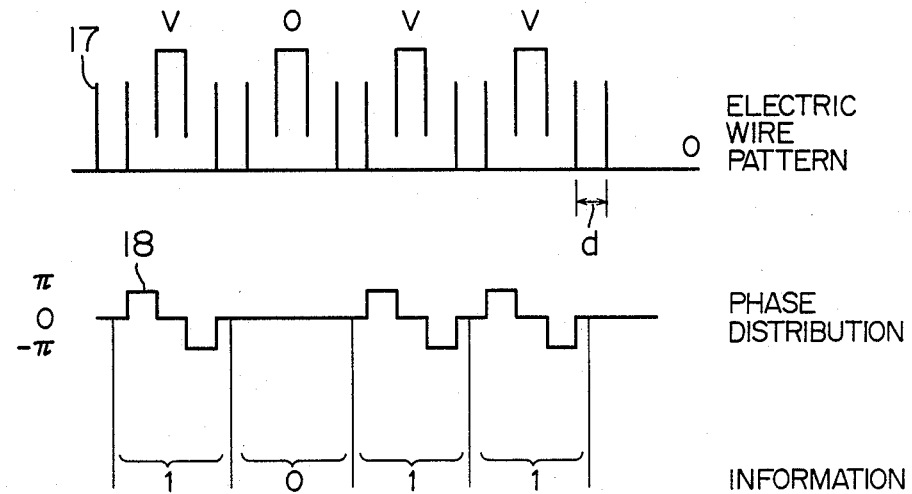

FIGS. 10 and 11 show another embodiment of the electrode wire pattern used in the present invention. In FIGS. 2 and 3, one bit of information corresponds to two times of the minimum spacing d of the electrode wire pattern. In FIGS. 10 and 11, one bit of information corresponds to three times of the minimum spacing d of the electrode wire (m=3), and four times thereof (m=4), respectively.

In the electrode wire pattern 14 of FIG. 10, ends of pairs of electrode wires at an interval of two times of the minimum spacing d are shorted, and a number of patterns 14 are arranged at a pitch of d. When a voltage V is applied to two adjacent electrode wire patterns 14, potentials at the opposite ends are of opposite polarities to each other and a fringing electric field is established between the opposite electrode wire patterns 14. Accordingly, the applied laser beam 15 is phase-modulated and the phase distribution is $\pm\pi$ in the fringing electric field and 0 in other areas. Since the light having the phase $\pm\pi$ is diffracted at the minimum spacing d, it is blocked by the slit 11, and the light having the phase 0 is diffracted at three times of the minimum spacing d and hence passes through the slit 11 as a result, the information "1010" appears on the screen.

In the electrode wire pattern 17 of FIG. 11, ends of electrode wire pairs at the minimum spacing d are shorted and sandwiched by electrode wire pairs at the spacing d connected to a ground level. When the voltage V is applied to the shorted wires, fringing electric fields fields of opposite polarities are established between the opposite grounded electrode wires. Thus, the laser beam 18 is phase-modulated into $\pm\pi$ and 0.

In FIGS. 10 and 11, the width a of the slit 11 is derived by putting 3 and 4 in m of the formula (4).

Figure 12A:
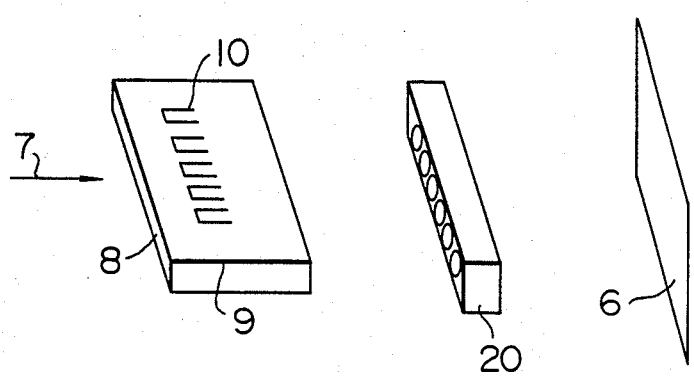
FIG. 12B is a perspective view of a further embodiment of the optical information generation apparatus of the present invention.

FIG. 12A is a perspective view of a further embodiment of the optical information generation apparatus of the present invention, and FIG. 13 illustrates an optical principle of FIG. 12A.

In the embodiment of FIG. 12A, a self-focusing lens array 20 is used instead of the slit 11 and the lens 12 used in the embodiment of FIG. 1. The self-focusing lens array 20 comprises a number of fiber lenses. The laser beam is distributed at a predetermined index of refraction by the fiber lenses.

Figure 13A:
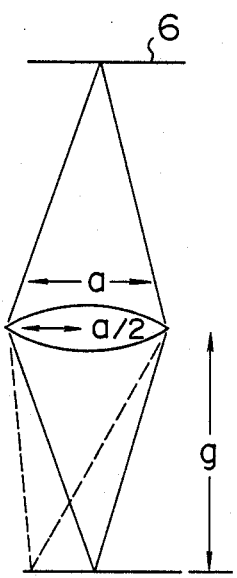
FIGS. 13A–13C illustrate an optical principle of FIG. 12.

FIG. 13A shows an optical system which uses an aperture of the lens 12 instead of the slit 11 of FIG. 1. When a radius of the lens is a/2 and a distance from the electrode wire pattern to the lens is g, a numerical aperture NA of the lens is given by a/2 g. Accordingly, a lens having NA=a/2 g may be used by using a/g determined by the formula (4). On the other hand, the self-focusing lens array 20 combines lights from respective areas of the electrode wire pattern as shown in FIG. 13C and focuses the phase-modulated light pattern onto the screen 6. Accordingly, the distance between the electrode wire pattern and the screen 6 may be very short and the optical information generation apparatus can be compacted. Since the NA of the optical system comprising the slit 11 and the lens 12 shown in FIG. 1 is given by a/2 g, the NA of the self-focusing lens 20 is determined by the following formula derived from the formula (4).

$$1.22 \frac{\lambda}{m \cdot d} \cdot \gamma < NA < 1.22 \frac{\lambda}{d} \cdot \delta \qquad (6)$$

Figure 13B:
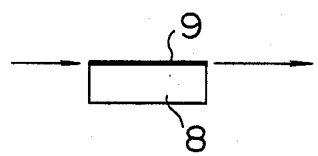
Figure 13C:
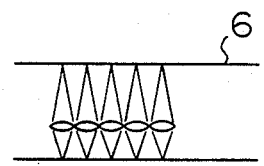
Figure 12B:
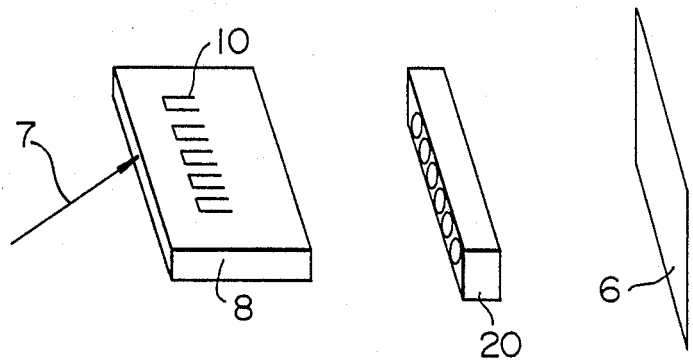
Figure 14:
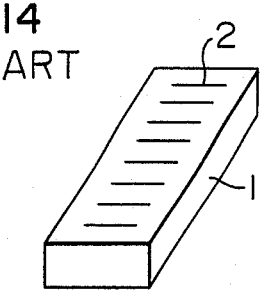
FIG. 14 shows a conventional electrode wire pattern.
Figure 15:
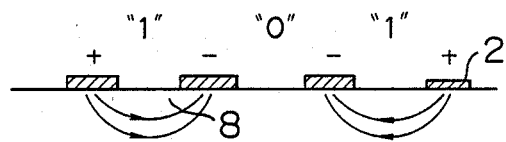
FIG. 15 is a side elevational view of the electrode wires of FIG. 14, and FIGS. 16A–16B show plan view and side view of a prior art spatial modulation device, respectively.

In the optical information generating apparatus of the present embodiment, the laser beam passes through the optical waveguide layer 9 on the surface of the LiNbO$_3$ crystal 8 as shown in FIG. 13B. Alternatively, an optical system which totally reflects the laser beam in the crystal 8 may be used as shown in FIG. 12B.

In accordance with the present invention, the stopper is not used but the aperture of the optical system is used so that the light beam phase-modulated by the electrode wire pattern is passed through the aperture to generate the information. Accordingly, the compact and reliable optical information generation apparatus is provided.

The present invention is applicable to not only the optical recorder such as laser printer but also an image display apparatus which displays character and graphic information.

We claim:

1. An optical information generation method comprising the steps of:
   phase-modulating a light beam passing through an electro-optical crystal, said crystal having a plurality of electrode wires arranged with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said light beam passing through said electro-optical crystal between ones of said plurality of electrode pairs supplied with different voltages from each other being provided with a phase differnce of $\pi$;
   blocking a portion of a light distribution spread by diffraction of the phase-modulated light beam; and
   generating optical information composed of a minimum unit corresponding to at least double a minimum electrode-to-electrode spacing.

2. An optical information generation method according to claim 1, wherein a plurality of electro-optical crystals are arranged in a line, and light beams from corresponding semiconductor lasers are applied to the electro-optical crystals, respectively.

3. An optical information generation method according to claim 1, wherein a slit is provided and the light passing through an aperture of the slit is focused by an optical system.

4. An optical information generation method according to claim 1, wherein the phase-modulated light beam from the electro-optical crystal is focused by an optical system, and a slit is arranged on a focal plane of the optical system.

5. An optical information generation method according to claim 1, wherein an optical system is provided which focuses the phase-modulated light beam from the electro-optical crystal and the light passing through an aperture of said optical system generates optical information.

6. An optical information generation method according to claim 1, wherein the light passed through the aperture is applied to a photo-sensitive record medium to record desired information in a laser printer.

7. An optical information generation apparatus comprising:
   an electro-optical crystal having a plurality of electrode wires arranged on a surface thereof with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said electro-optical crystal phase-modulating a light beam passing therethrough by providing a phase difference of $\pi$ to said light beam passing through the electro-optical crystal between ones of said electrode pairs supplied with different voltages from each other;
   an optical system for focusing the phase-modulated light beam from said electro-optical crystal; and
   aperture means for blocking a portion of light distribution spread by diffraction of the phase-modulated light beam;
   whereby a plurality of light information composed of a minimum unit equal to at least double a minimum electrode-to-electrode spacing are generated by the light passed through said aperture means.

8. An optical information generation apparatus according to claim 7, wherein said aperture means is a slit having a predetermined width of aperture arranged between said electro-optical crystal and said optical system.

9. An optical information generation apparatus according to claim 7, wherein said aperture means is a slit having a predetermined width of aperture arranged near a focal plane of said optical system.

10. An optical information generation apparatus according to claim 7, wherein said aperture means is an aperture of said optical system.

11. An optical information generation apparatus according to claim 7, wherein a plurality of said electro-optical crystals are arranged in a line, a plurality of semiconductor lasers are provided for the electro-optical crystals, and light beams from corresponding semiconductor lasers are applied to the electro-optical crystals, respectively.

12. An optical information generation apparatus comprising:
   an electro-optical crystal having an optical waveguide layer formed on a surface thereof and having a plurality of electrode wires arranged on a surface of the optical waveguide layer with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said optical waveguide layer phase-modulating a light beam passing therethrough by providing a phase difference of $\pi$ to said light beam passing through said optical waveguide layer between ones of said electrode pairs supplied with different voltages from each other;

an optical system for focusing the phase-modulated light beam from said electro-optical crystal; and aperture means for blocking a portion of light distribution spread by diffraction of the phase-modulated light beam;

whereby a plurality of light information composed of a minimum unit equal to at least double a minimum electrode-to-electrode spacing are generated by the light passed through said aperture means.

13. An optical information generation apparatus according to claim 12, wherein said electrode wires are formed on a substrate of a different material than that of said electro-optical crystal, and said waveguide is press-contacted to said electro-optical crystal.

14. An optical information generation apparatus according to claim 12, further comprising a grating formed on said optical waveguide layer for directing the light beam into said optical waveguide layer.

15. An optical information generation apparatus according to claim 12, further comprising a grating formed on said optical waveguide layer for taking out the phase-modulated light beam from said optical waveguide layer.

16. An optical information generation apparatus according to claim 12, wherein a plurality of said electro-optical crystals are arranged in a line and a plurality of semiconductor lasers are provided for the electro-optical crystals, and light beams from corresponding semiconductor lasers are applied to the electro-optical crystals, respectively.

17. An optical information generation apparatus according to claim 12, comprising a plurality of ground electrodes located between said electrode pairs and arranged alternately with said electrode pairs.

18. An optical information generation apparatus according to claim 12, wherein one of said first and second voltages is a ground potential.

19. An optical information generation apparatus according to claim 12, wherein said aperture means blocks light diffracted with a minimum electrode-to-electrode spacing and passes light diffracted with at least double said minimum electrode-to-electrode spacing.

20. An optical information generation method comprising the steps of:

phase-modulating a light beam passing through an optical waveguide layer which is formed on an electro-optical crystal, said electro-optical crystal having a plurality of electrode wires arranged with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said light beam passing through said optical waveguide layer being phase-modulated by an electro-optical effect due to the voltage applied to the electrode wires;

blocking a portion of a light distribution spread by diffraction of the phase-modulated light beam; and generating optical information composed of a minimum unit corresponding to at least double a minimum electrode-to-electrode spacing.

21. An optical information generation method according to claim 20, wherein a linearly polarized laser beam polarized parallelly to the optical waveguide layer is applied to the optical waveguide layer.

22. An optical information generation method according to claim 20, wherein the light beam is directed into the optical waveguide layer by a grating formed on the optical waveguide layer.

23. An optical information generation method according to claim 20, wherein the phase-modulated light beam is taken out of the optical waveguide layer by a grating formed on the optical waveguide layer.

24. An optical information generation method according to claim 20, wherein the electrode wires are formed on a substrate of different material than that of the electro-optical crystal, and the substrate is press-contacted to said optical waveguide layer.

25. An optical information generation apparatus according to claim 20, wherein one of said first and second voltages is a ground potential.

26. An optical information generation method comprising the steps of:

phase-modulating a plurality of light beams from corresponding semiconductor lasers passing through optical waveguide layers formed on a plurality of electro-optical crystals arranged in a line, each of said plurality of electro-optical crystals having a plurality of electrode wires arranged with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said plurality of light beams passing through said optical waveguide layers being phase-modulated by an electro-optical effect due to the voltage applied to the electrode wires;

blocking a portion of a light distribution spread by diffraction of the phase-modulated light beams; and generating optical information composed of a minimum unit corresponding to at least a double minimum electrode-to-electrode spacing.

27. An optical information generation method comprising the steps of:

phase-modulating a light beam passing through an electro-optical crystal, said crystal having a plurality of electrode wires arranged with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said light beam passing through said electro-optical crystal between ones of said plurality of electrode pairs supplied with different voltages from each other being provided with a phase difference of $\pi$;

blocking a portion of a light distribution spread by diffraction of the phase-modulated light beam using a self-focusing lens array; and generating optical information composed of a minimum unit corresponding to at least double a minimum electrode-to-electrode spacing;

wherein said lens array focuses the phase-modulated light beam from the electro-optical crystal and generates said optical information.

28. An optical information generation apparatus comprising:

an electro-optical crystal having an optical waveguide layer formed thereon and having a plurality of electrode wires arranged on a surface thereof, with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said optical waveguide layer phase-modulating a light beam passing therethrough by providing a phase difference of $\pi$ to said light beam passing through the optical waveguide layer between ones of said electrode pairs supplied with different voltages from each other;

an optical system for focusing the phase-modulated light beam from said optical waveguide layer; and aperture means for blocking a portion of light distribution spread by diffraction of the phase-modulated light beam;

whereby a plurality of light information composed of a minimum unit equal to at least double a minimum electrode-to-electrode spacing are generated by the light passed through said aperture means.

29. An optical information generation apparatus according to claim 28, wherein said optical waveguide layer is a striped waveguide layer.

30. An optical information generation apparatus according to claim 28, wherein said electro-optical crystal is a LiNbO$_3$ crystal, and said optical waveguide layer is formed on the LiNbO$_3$ crystal by Ti diffusion.

31. An optical information generation apparatus according to claim 28, comprising a plurality of ground electrodes located between said electrode pairs and arranged alternately with said electrode pairs.

32. An optical information generation apparatus comprising:

an electro-optical crystal having an optical waveguide layer formed thereon and having a plurality of electrode wires arranged on a surface thereof with a predetermined inter-electrode spacing in a predetermined direction, said plurality of electrode wires including at least a plurality of pairs of adjacent electrode wires, the electrode wires of each pair being supplied with the same voltage, each of said plurality of electrode pairs being supplied with one of first and second voltages, said electro-optical crystal phase-modulating a light beam passing therethrough by providing a phase difference of $\pi$ to said light beam passing through the electro-optical crystal between ones of said electrode pairs supplied with different voltages from each other;

an optical system for focusing the phase-modulated light beam from said electro-optical crystal; and a self-focusing lens array for blocking a portion of light distribution spread by diffraction of the phase-modulated light beam;

whereby a plurality of light information composed of a minimum unit equal to at least double a minimum electrode-to-electrode spacing are generated by the light passed through said self focusing lens array.

* * * * *